United States Patent [19]

Coyle

[11] Patent Number: 4,532,623
[45] Date of Patent: Jul. 30, 1985

[54] APPARATUS AND METHOD FOR REDUCING SHOCK AND VIBRATION CAUSED BY CARTRIDGE LOADING

[75] Inventor: Peter J. Coyle, Oaklyn, N.J.

[73] Assignee: RCA Corporation, Princeton, N.J.

[21] Appl. No.: 590,794

[22] Filed: Mar. 19, 1984

[51] Int. Cl.³ .............................................. G11B 3/60
[52] U.S. Cl. .................................................. 369/271
[58] Field of Search .............................. 369/270, 271

[56] References Cited

U.S. PATENT DOCUMENTS

| | | | |
|---|---|---|---|
| 2,386,166 | 10/1945 | Lissiansky | 369/191 |
| 2,523,157 | 9/1950 | Somma | 369/202 |
| 3,031,195 | 4/1962 | Lunsford | 369/270 |
| 3,103,364 | 9/1963 | Macks et al. | 369/271 |
| 4,054,291 | 10/1977 | Maeda | 369/271 |
| 4,097,895 | 6/1978 | Spong | 358/128 |
| 4,190,240 | 2/1980 | Peterson | 269/21 |
| 4,234,195 | 11/1980 | Shibata | 369/270 |
| 4,433,410 | 2/1984 | Siryj et al. | 369/291 |

Primary Examiner—Steven L. Stephan
Attorney, Agent, or Firm—J. S. Tripoli; R. L. Troike; C. L. Maginniss

[57] ABSTRACT

In an optical disc player having multiple read/write stations, the shock and vibration which is induced by the operation of loading one disc cartridge onto the turntable of one station may disrupt the recording/playing process in another station. The present invention discloses an apparatus and method for cushioning the shock of the loading process. As the cartridge is being loaded, pressurized air is supplied through orifices in the turntable reference plate to reduce the shock throughout the system. The air between the moving cartridge and the reference plate acts as a spring and damper to reduce the shock of the load cycle. In one embodiment, the pressurized air is supplied through the same orifices which are subsequently used to draw a vacuum which retains the cartridge against the reference plate.

10 Claims, 4 Drawing Figures

APPARATUS AND METHOD FOR REDUCING SHOCK AND VIBRATION CAUSED BY CARTRIDGE LOADING

The U.S. Government has rights in this invention pursuant to a U.S. Government contract.

The present invention relates to record disc systems for use in recording and retrieving information from a disc record and, more particularly, to a system for recording and retrieving information wherein the system includes an apparatus for reducing the shock and vibration caused by the loading of a disc record on a turntable.

High density optical recording systems which may be used for recording and playing back information are known in the prior art. For example, U.S. Pat. No. 4,097,895, entitled "Multi-layer Optical Record" issued on June 27, 1978, to F. W. Spong, relates to an optical disc record/playback system wherein data are recorded on the surface of a recording medium. In a Spong system the thermal energy of a focused high intensity light beam causes variations of the optical properties on the surface of the recording medium. For example, in one system the thermal effects of a laser beam form pits in an absorptive coating on the surface of an optical disc. In the Spong system, approximately $10^{11}$ bits of information can be recorded on one side of a disc-shaped record medium having a thirty centimeter diameter.

In some optical recording systems, it is desirable to provide a multi-disc, mass memory in which any data from among approximately $10^{13}$ bits can be automatically accessed within a few seconds. In one system, such as the system described in U.S. Pat. application Ser. No. 445,489, "Automatic Handling Mechanism for an Optical Disc Enclosed in a Protective Cartridge," filed Nov. 30, 1982, for B. W. Siryj et al., and assigned to the same assignee as the present invention, a library of several disc records are stored in a storage bin of an optical mass memory system. A mechanism is used for transferring a selected disc from the storage bin to read/write station where the information may be processed. Such mechanisms are capable of automatically selecting the correct disc, automatically handling the disc into and out of the read/write station, and automatically returning the disc to a storage location after processing is complete. Automatic handling of this type is accomplished quickly, reliably and accurately so as to provide access to the data at a high rate of speed.

The data transfer rate of such a system may be enhanced by the addition of a second read/write station. Such an addition permits a virtually continuous flow of data. While one read/write station processes data, the other station unloads its disc cartridge to the disc changer module, receives a new disc from the changer module, and rotates the new disc up to speed. Even with this tandem form of operation, disc handling speed is of utmost importance, and a worst-case disc access must be performed within five to six seconds. As a result of the movements within one read/write station which occur while the other is reading and/or writing data to its disc, there are mechanical interactions between the two stations which must be remedied in order that the data transfer be as error-free as possible.

U.S. Pat. application, Ser. No. 411,973, "An Optical Disc System Having Momentum Compensation," filed Aug. 26, 1982, for T. D. Michaelis, and assigned to the same assignee as the present invention, offers a solution to the vibrations caused by inter alia fast acceleration and deceleration of the disc during spinup and braking, and movement of the translation stage used in radially positioning the optical head. The focus of the Michaelis application is a momentum compensating mass coupled to the moving elements to reduce or eliminate the reaction forces which interfere with or distort the information recording or retrieving operations.

The present invention relates to the problem of the shock and vibration induced by the cartridge loading sequence on one turntable disrupting the recording or playback operation on another turntable. It is apparent that the shock transmitted to the optical table by the impact of a cartridge against the turntable reference plate will cause disruption of the focus head, as the focus head motion is along the same axis as the cartridge motion. Physical reorientation of the affected elements within the optical recording system is impractical. Because it is usually more desirable to eliminate an interfering vibration at its source than to compensate for it, the present invention is an improvement in an optical disc system whereby the shock and vibration induced by the process of loading a disc cartridge against the turntable reference plate is significantly reduced.

In accordance with one embodiment of the present invention, an apparatus is disclosed for reducing the shock induced by the impact of a cartridge with a mounting plate. The apparatus includes means for sensing motion of the cartridge toward the mounting plate. The apparatus further includes means responsive to the sensing means for introducing pressurized air between the cartridge and the mounting plate while the cartridge is in motion toward the mounting plate.

Other features and advantages of the present invention will be more fully understood from the following detailed description of the preferred embodiments, the appended claims, and the accompanying drawings, in which:

Figure 1:
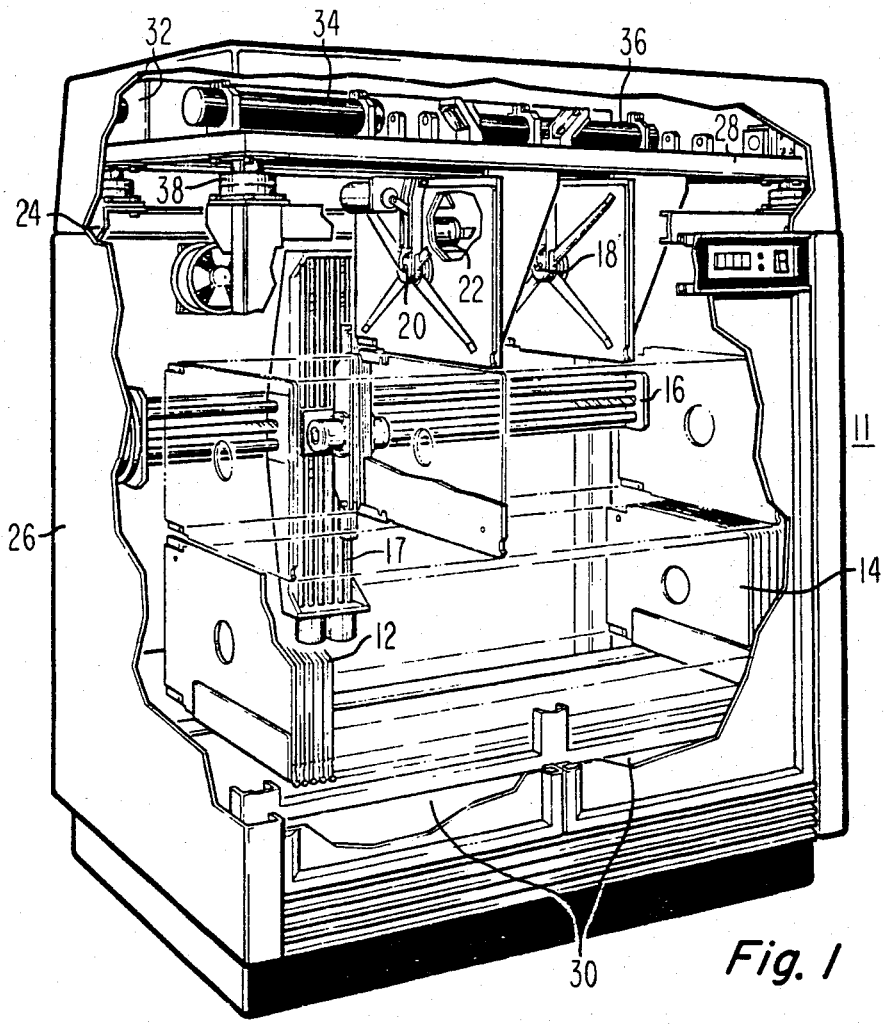
FIG. 1 is a cut-away perspective view of an optical disc player apparatus incorporating the present invention.

Reference will now be made to FIG. 1 which shows an optical disc player/recorder apparatus 11. In the apparatus of FIG. 1, discs are permanently housed in cartridges 12 during the automatic cycling. Illustratively, the discs and cartridges may be of a type described in U.S. Pat. No. 4,433,410, "Protective Cartridge for Optical Discs," issued to B. W. Siryj et al. on Feb. 21, 1984. The player/recorder 11 is a modular design comprising a storage module 14, a transport module 16 and two read/write modules 18 and 20. The player/recorder 11 may be used with single-sided optical discs. Record/play module 20 will record and playback data from a disc with record/playback head 22. Although there are two read/write modules shown in the apparatus of FIG. 1, the system concept is not limited to two read/write modules.

A structural steel assembly 24 provides the framework for the player. Panel assembly 26 encloses the unit. Optical platform 28 is located above read/write modules 18 and 20.

Cartridges 12 are stored in the lower part of the unit in the storage module 14. Located below the disc storage module 14 is the electronics compartment 30 which may contain all of the electronics necessary to operate the player/recorder. Located above the disc storage module 14 is the disc transport module 16, which is the mechanism that picks up a cartridge from its stored position and transports it, via elevator 17, to one of the read/write modules 20 or 18 for record or playback. Following record or playback, transport module 16 returns the cartridge to the storage module 14.

The optical platform 28 is located above read/write modules 18 and 20. Lasers 32, 34 and 36 and their associated optics are affixed to the optical platform 28. Laser 32 may be a high powered laser (illustratively, a water cooled argon laser) which provides the light beams to read/write stations 18 and 20 for writing data on the disc. Lasers 34 and 36, which may be of lower power (illustratively, helium neon lasers), provide the light beams to read/write stations 20 and 18, respectively, for reading the data on the disc. The optical platform 28 is mounted by means of air shock mounts 38 to the frame member 24. Suspending the optical platform 28 via the vibration isolators 38 should prevent vibratory motion from the transport module 16 from adversely affecting data during record or playback. Both the cartridge and disc are locked in place during the read/write operation. The disc is locked to a turntable via a rotating vacuum chuck (illustratively, the vacuum chuck shown in the aforementioned Siryj et al. application); the cartridge is held against a reference plate by vacuum cups mounted in the plate.

Cartridges 12 are stored and retained individually in the cartridge storage module 14. Separate slots retain and space the cartridges 12 along the length of the player 11.

Figure 2:
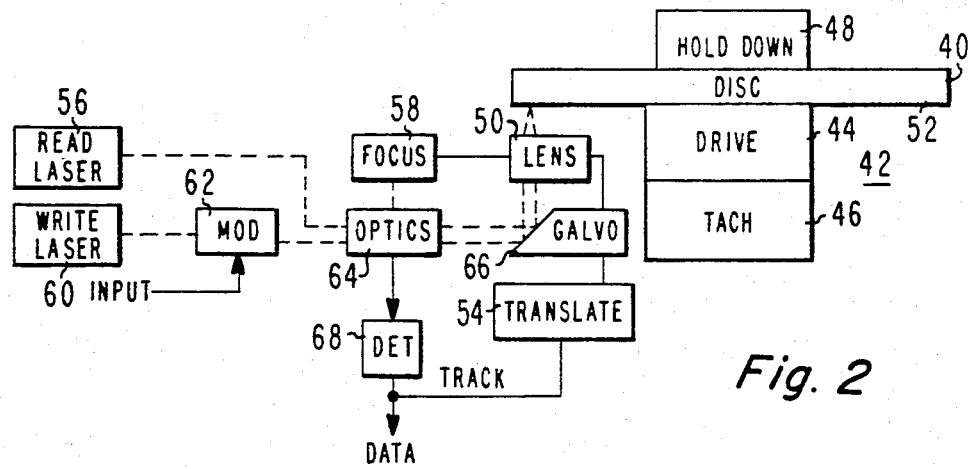
FIG. 2 illustrates, via a block diagram representation, a functional description of the drive assembly for one of the read/write stations of the apparatus of FIG. 1.

The read/write modules 18 and 20 provide the functions of record, read and data verification. Referring to FIG. 2, a functional diagram for a read/write module is shown. In operation, disc 40 (the cartridge is not shown in this functional arrangement) is placed on turntable 42 which includes drive 44, tachometer 46 and hold down 48. After disc 40 is clamped in place, disc drive 44 is activated to rotate disc 40 at a predetermined angular speed, as measured by tachometer 46. Before a record or read operation can proceed, however, focus lens 50 must be positioned under the desired portion of the disc and arranged such that the light beams are focused onto surface 52 of disc 40. Lens 50 is positioned with respect to disc 40 by a motor driven translation stage 54.

When lens 50 is properly positioned with respect to the disc surface, read laser 56 is turned on so that a proper focus setting may be obtained. Focus is achieved by a servo-loop (not shown) which operates from the light from the read laser 56 reflected from disc surface 52. A lens positioner 58 maintains the focus distance from disc surface 52 during both record and read operations.

After focus has been achieved, the desired operation may be initiated. In the record mode write laser 60 is activated. Data is clocked into modulator 62 which modulates the light that impinges on the disc surface 52 from laser 60. The modulated record beam is directed to disc 40 via optics 64 and galvanometer controlled mirror 66. The modulated record beam is focused on disc surface 52 to form a series of pits of varying duration and spacing as the disc 40 rotates. The resultant track that is formed contains the recorded information. When information is to be recorded in concentric tracks, recording in a second track requires inactivating the write laser 60 for a short time while lens 50 is repositioned to a point on disc 40 where the next track is to be recorded. The repositioning takes place very quickly (for example, less than 1 millisecond) and may be accomplished by moving the galvanometer 66 via translation stage 54. The translation stage 54 moves in increments (for example, four track spacings) and intermediate positions may be obtained by commanding the galvanometer 66 to tilt slightly. After repositioning takes place, write laser 60 is reactivated and a second track of data is fed into modulator 62 for recording. This sequence will repeat for as long as data is available for recording. To ensure that the desired track may be found during read, a unique address is recorded within each track. It should be noted that the information may be recorded in a spiral format on the disc surface 52 by moving translation state 54 at a constant rate across the surface of the disc 40.

In the read mode the write laser 60 is turned off. When lens 50 is positioned and focus is achieved the track servo is activated causing the read beam to lock onto the track nearest the center of the optical field of view. The track servo uses the galvanometer 66 for steering the beam in response to the detected signal from detector 68. The difference between the track being followed and the desired track is used to reposition the galvanometer 66 and translation stage 54 to the location of the desired track. When the proper track is being read, the data may be outputed from detector 68 to suitable processing circuitry (not shown).

Data verification during recording may be achieved by reading the information just after it has been recorded. The position of the focus read laser spot is adjusted so that it illuminates the pits being recorded just after recording takes place. Thus, the output data from the record/read module during a record operation may be compared to that which was input. If the number of errors encountered in the read process is below the requirements of the system no correction is made. When errors are detected, the data may be rerecorded and again verified for accuracy.

Figure 3:
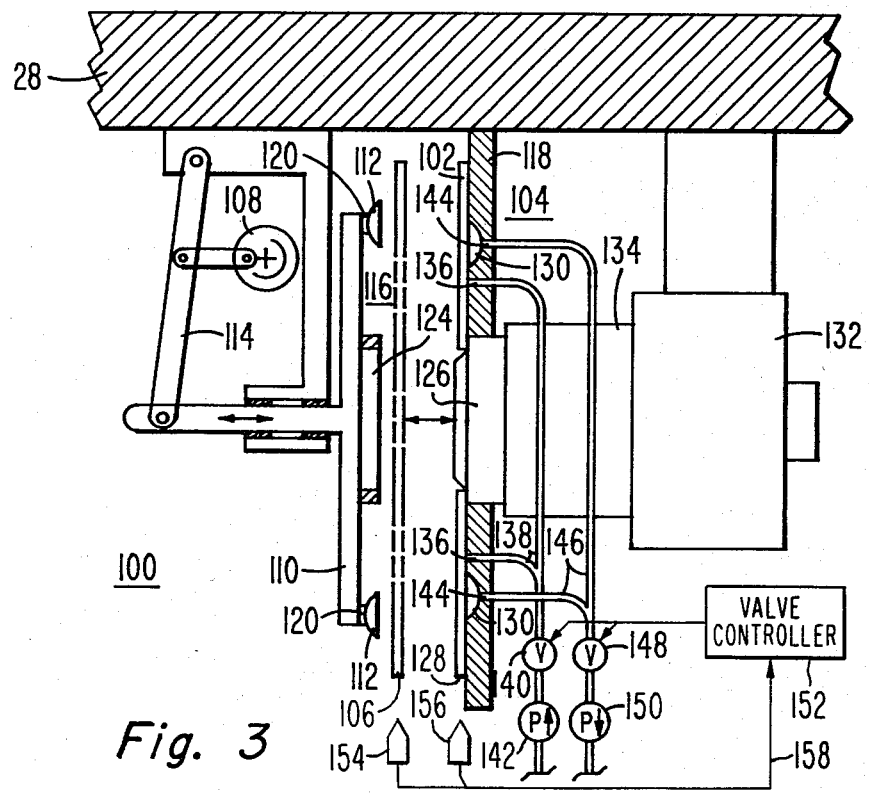
FIG. 3 is a side view, partly in section, of the automatic load mechanism of FIG. 1 embodying the present invention.

The operation of the disc/cartridge load mechanism will now be explained with reference to FIG. 3 which shows a side view of the mechanism. The function of the automatic load mechanism 100 is to accurately locate the disc/cartridge assembly 102 onto the turntable assembly 104 and to spin the disc up to speed while it is within cartridge 102.

Elevator 17 (shown in FIG. 1) positions cartridge 102 into the incoming position 106. In this position cartridge 102 is ready to be loaded onto turntable assembly 104. Rotary motion is transmitted to link 108. Vacuum cup plate 110 and vacuum cups 112, which may typically number four, are moved linearly by linkage 114. Vacuum cup assembly 116 approaches cartridge 102. Before vacuum cups 112 contact cartridge 102, a vacuum is established through them via vacuum hoses and pump (not shown), so that when vacuum cups 112 encounter the face of cartridge 102 in position 106, vacuum cups 112 take hold. Vacuum cup assembly 116 and cartridge 102, as a unit, move toward turntable assembly 104.

The motion conveyed to linkage 114 by the rotation of link 108 is sinusoidal so that cartridge 102 starts out slowly, travels faster at the midpoint and slows down just before reference plate 118 is contacted. Cartridge 102 contacts reference plate 118 before the end of the travel of vacuum cup assembly 116. The interface between vacuum cup plate 110 and vacuum cups 112 is spring loaded by springs 120. The vacuum cups 112 stop moving while vacuum cup plate 110 with disc engagement pad 124 continues to move forward in order to ensure that the disc contacts vacuum chuck 126 before vacuum cups 112 release cartridge 102. Engagement pad 124 is made of sponge rubber so that it will collapse when necessary to act as a spring.

At the instant of contact of cartridge 102 with reference plate 118, a vacuum delivery system comprising hoses 146, valve 148 and vacuum pump 150, is enabled and a vacuum is drawn through orifices 144 in reference plate 118. This vacuum pulls cartridge 102 against vacuum cups 130, which may typically number four, disposed symmetrically about a central point in turntable assembly 104, and which are recessed into reference plate 118. Thus, cartridge 102 is retained against reference plate 118.

At the same instant, vacuum is applied to vacuum chuck 126. This vacuum holds the disc within cartridge 102 in position to be rotated by motor 132, which is coupled to vacuum chuck 126 by air bearing support 134. A more detailed description of vacuum chuck 126 and of vacuum cup assembly 116 is found in the aforementioned Siryj et al. application. The over travel of vacuum cup assembly 116 ensures that the disc is held onto vacuum chuck 126, and that cartridge 102 is retained against reference plate 118 by vacuum cups 130, before vacuum cups 112 release cartridge 102. The load cycle is complete when vacuum cup assembly 116 moves back a small distance (e.g., 3/16 inch). At this time vacuum cups 112 may still be in physical contact with cartridge 102; however, their vacuum has been removed.

According to the present invention, reference plate 118 further includes orifices 136 (illustratively, they may number four) which are coupled to a positive-pressure air delivery system comprising air hoses 138, valve 140 pump 142, which system delivers pressurized air through orifices 136. Valve 140 is normally closed, thus preventing air flow out of orifices 136. However, when cartridge 102 is being moved by vacuum cup assembly 116 from position 106 to position 128 during a cartridge load operation, valve 140 is opened, and a cushion of air is introduced between the moving cartridge 102 and reference plate 118.

Motion of cartridge 102 between positions 106 and 128 is sensed by proximity detector 154, aligned with position 106, and proximity detector 156, aligned with position 128. The output signals of detectors 154 and 156 are carried on signal leads 158 to valve controller 152 which, in turn, provides controlling signals to valves 140 and 148 to thereby cause valve 140 to be opened when cartridge 102 is in motion between positions 106 and 128, and cause valve 148 to be opened when cartridge 102 is detected at position 128. Proximity detectors 154 and 156 may typically comprise optical sensors, responsive to a specific surface of cartridge 102.

During the initial moments of its motion, when cartridge 102 is relatively distant from reference plate 118, the air introduced via orifices 136 is forced out from between cartridge 102 and reference plate 118 and the motion of cartridge 102 is not measurably impeded. As cartridge 102 approaches reference plate 118 and the gap between them becomes increasingly smaller, a combination spring and damper effect occurs due to the increasing restriction to outward air flow as the gap decreases. The air trapped in gap acts as a spring and the escaping air acts as a damper.

This operation brings cartridge 102 to a smooth but complete halt in position 128, with a minimum of complexity. Once cartridge 102 is in contact with reference plate 118 in position 128, the valve 140 permitting the flow of air from pump 142 is closed, and the vacuum delivery system, providing a vacuum to vacuum cups 130, is enabled, thus retaining cartridge 102 firmly against reference plate 118.

Figure 4:
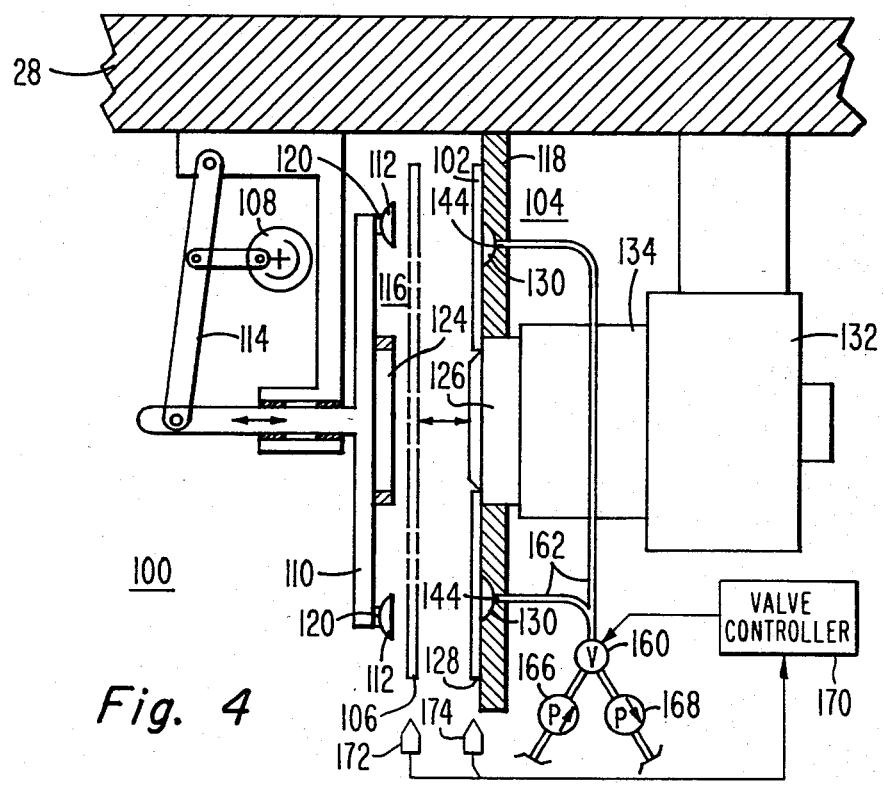
FIG. 4 is a side view, partly in section, of the automatic load mechanism of FIG. 1 including a second embodiment of the present invention.

In a second embodiment of the present invention, as shown in FIG. 4, both the vacuum delivery system and the pressurized air delivery system are combined using a single, 3-way valve 160 and the existing hoses 162 and orifices 144, formerly used only to provide the vacuum to retain cartridge 102 against reference plate 118. In this embodiment, valve 160 is selectively controlled to enable pressurized air from pump 166 via hoses 162 through orifices 144 when vacuum cup assembly 116 is moving cartridge 102 from position 106 to position 128, thereby providing the spring and damper effect to cushion the impact of cartridge 102 against reference plate 118. Proximity detector 172 senses the presence of cartridge 102 in position 106 and proximity detector 174 senses its presence in position 128. Thus, when cartridge 102 is in transit between positions 106 and 128, valve controller 170 commands valve 160 to open a path between pump 166 and orifices 144. At the instant of contact, when cartridge 102 reaches position 128, valve controller 170 commands valve 160 to switch so as to enable vacuum pump 168 to draw a vacuum through hoses 162 from vacuum cups 130, thereby retaining cartridge 102 firmly against reference plate 118.

The FIG. 4 embodiment requires a valve 160 which can switch rapidly from positive-pressure pump 166 to vacuum pump 168. A solenoid-controlled valve would meet the necessary speed requirements in this application.

The pressure of air delivered into the gap between the moving cartridge 102 and reference plate 118 will depend to a great extent on the system parameters including the size, placement and number of orifices 136, 144. It is estimated that positive-pressure pumps 142, 166 should be capable of delivering air at 25–50 pounds per square inch.

Actual experience with a specific system may indicate that optimum performance, i.e., cartridge handling speed vs. cartridge mounting shock, is obtained by varying the air pressure during the cartridge load operation. For example, if it is found that the system is overdamped, it may be advantageous to decrease the air pressure through orifices 136, 144 as cartridge 102 approaches reference plate 118.

Other embodiments of the present invention will be apparent to those skilled in the art to which it pertains. The scope of this invention is not intended to be limited to the embodiments disclosed herein but should instead be gauged by the breadth of the claims which follow.

What is claimed is:

1. An apparatus for reducing the shock induced by the impact of a cartridge with a mounting plate including a first and a second plurality of orifices, said apparatus comprising:
   means for sensing motion of said cartridge toward said mounting plate;

means responsive to said sensing means for introducing pressurized air between said cartridge and said mounting plate while said cartridge is in motion toward said mounting plate, said means for introducing pressurized air including pump means coupled to said first plurality of orifices; and means for retaining said cartridge against said mounting plate, said retaining means including a plurality of vacuum cups and a vacuum pump coupled thereto, wherein said vacuum cups are held against a side surface of said cartridge by the force of a vaccum drawn by said vacuum pump through said second plurality of orifices.

2. The apparatus according to claim 1 further including valve means responsive to said sensing means and coupled between said pump means and said first plurality of mounting plate orifices to control the introduction of said pressurized air.

3. An apparatus for reducing the shock induced by the impact of a cartridge with a mounting plate including a plurality of orifices, said apparatus comprising:

means for sensing motion of said cartridge toward said mounting plate;

means responsive to said sensing means for introducing pressurized air between said cartridge and said mounting plate while said cartridge is in motion toward said mounting plate, said means for introducing pressurized air including pump means coupled to said orifices; and means for retaining said cartridge against said mounting plate, said retaining means includes a plurality of vacuum cups and a vacuum pump coupled thereto, wherein said vacuum cups are held against a side surface of said cartridge by the force of a vacuum drawn by said vacuum pump through said plurality of orifices.

4. The apparatus according to claim 3 further including valve means coupling said plurality of orifices with said vacuum pump and said pump means, said valve means being responsive to said sensing means for selectively controlling the direction of air flow through said plurality of orifices.

5. In an optical information storage and retrieval system including a storage location for storing a cartridge housing a disc record and further including a turntable assembly having a fixed mounting plate for receiving said cartridge, said mounting plate including a first and a second plurality of orifices, an apparatus for mounting said cartridge on said mounting plate, said apparatus comprising:

means for transporting said cartridge from said storage location to said turntable mounting plate;

means for introducing pressurized air between said cartridge and said mounting plate while said cartridge is being transported by said transporting means toward said mounting plate, said means for introducing pressurized air including pump means coupled to said first plurality of orifices; and means for retaining said cartridge against said mounting plate, said retaining means including a plurality of vacuum cups and a vacuum pump coupled thereto, wherein said vacuum cups are held against a side surface of said cartridge by the force of a vacuum drawn by said vacuum pump through said second plurality of orifices.

6. The apparatus according to claim 5 further including valve means coupled between said pump means and said first plurality of mounting plate orifices to control the introduction of said pressurized air.

7. In an optical information storage and retrieval system including a storage location for storing a cartridge housing a disc record and further including a turntable assembly having a fixed mounting plate for receiving said cartridge, said mounting plate including a plurality of orifices, an apparatus for mounting said cartridge on said mounting plate, said apparatus comprising:

means for transporting said cartridge from said storage location to said turntable mounting plate;

means for introducing pressurized air between said cartridge and said mounting plate while said cartridge is being transported by said transporting means toward said mounting plate, said means for introducing pressurized air including pump means coupled to said orifices; and means for retaining said cartridge against said mounting plate, said retaining means including a plurality of vacuum cups and vacuum pump coupled thereto, wherein said vacuum cups are held against a side surface of said cartridge by the force of a vacuum drawn by said vacuum pump through said plurality of orifices.

8. The apparatus according to claim 7 further including valve means coupling said plurality of orifices with said vacuum pump and said pump means for selectively controlling the direction of air flow through said plurality of orifices.

9. In an optical information storage and retrieval system including a storage location for storing a cartridge housing a disc record and further including a turntable assembly having a fixed mounting plate for receiving said cartridge, said mounting plate including a plurality of orifices, a method for mounting said cartridge on said turntable mounting plate including the steps of:

transporting said cartridge from said storage location to said turntable mounting plate;

introducing pressurized air between said cartridge and said mounting plate through said orifices while said cartridge is moving toward said mounting plate; and applying a vacuum between said cartridge and said mounting plate through said orifices when said cartridge makes contact with said mounting plate for retaining said cartridge thereon.

10. The method according to claim 9 wherein said introducing step further includes decreasing the pressure of said pressurized air as said cartridge approaches said mounting plate.

* * * * *